United States Patent [19]
Oshikiri

[11] Patent Number: 4,725,916
[45] Date of Patent: Feb. 16, 1988

[54] SHORT-CIRCUIT PROTECTIVE CIRCUIT FOR UNINTERRUPTIBLE POWER SUPPLY EQUIPMENT

[75] Inventor: Keiichi Oshikiri, Hyogo, Japan

[73] Assignee: Mitsubishi Denki Kabushiki Kaisha, Tokyo, Japan

[21] Appl. No.: 850,676

[22] Filed: Apr. 11, 1986

[30] Foreign Application Priority Data

May 15, 1985 [JP] Japan .................... 60-101438

[51] Int. Cl.⁴ .................................. H02H 7/26
[52] U.S. Cl. ............................. 361/104; 361/93; 307/29; 307/39; 307/64
[58] Field of Search .............. 361/87, 93, 94, 104; 307/29, 38, 39, 64, 80

[56] References Cited

U.S. PATENT DOCUMENTS 4,122,516 10/1978 Tokunaga .................... 307/64 X

FOREIGN PATENT DOCUMENTS 716111 2/1980 U.S.S.R. .................... 307/29

OTHER PUBLICATIONS

Yukiyoshi Saeki, "Example of Application in Office Center", Dec. 1984, pp. 40-43.
Tadao Mizutani et al., "Power Transistorized Uninterruptible Power Supply", IEEE Transactions on Industry Applications, vol. IA-20, No. 4, Jul./Aug. 1984, pp. 961-966.

Primary Examiner—J. R. Scott
Assistant Examiner—Howard L. Williams
Attorney, Agent, or Firm—Bernard, Rothwell & Brown

[57] ABSTRACT

A short-circuit protective circuit for uninterruptible power supply equipment of the type in which in a short-circuit at a branch feeder in a load part, a bypass thyristor switch is operated to connect in a moment directly to a commercial power supply and kept at ON for a short time while an inverter circuit remains operating, and consequently a short-circuit fuse attached to said branch feeder is blown due to energy from the bypass-circuit power supply, and thus power supply to the load continues.

According to the invention, in an accident of short-circuit at the load part, the load is connected temporarily to the bypass circuit, and supplied with power through both the inverter circuit and the bypass circuit to rapidly blow the fuse in a short time, and then power supply through only the inverter circuit to the load returns.

2 Claims, 2 Drawing Figures

SHORT-CIRCUIT PROTECTIVE CIRCUIT FOR UNINTERRUPTIBLE POWER SUPPLY EQUIPMENT

BACKGROUND OF THE INVENTION

1. Field of the Invention

This invention relates to a short-circuit protective circuit for uninterruptible power supply equipment, and more particularly which comprises not only an inverter circuit but also a bypass circuit connected with a commercial power supply and in parallel to the inverter circuit.

2. Description of the Prior Art

A conventional short-circuit protective circuit for uninterruptible power supply is illustrated in the form of schematical block diagram in FIG. 1, in which reference numerals designate 1, an inverter circuit; 2, a thyristor switch connected, through a line 3, between the inverter circuit 1 and a plurality of feeders; 4, fuses attached to feeders; 5, a current sensor disposed approximately at the middle position of the line 3; 6, a commercial power supply to a bypass circuit 11 connected to the line 3 through a bypass thyristor switch 7; 8, an overcurrent detector connected to the current sensor 5; 9, an AND circuit which outputs a logical product of a signal $S_1$ generated when there is a commercial supply voltage synchronous with the output voltage of the inverter circuit 1 and the output signal of the overcurrent detector 8; 10, a flip-flop for discriminating whether power is supplied through the bypass circuit 11 or through the inverter circuit 1; 12 and 13, gate drive circuits; 14, a turn-off delay circuit for delaying turn-off operation of the bypass thyristor switch 7; 15, an interlock circuit for bringing interlock with signal $S_2$ discerning that the inverter circuit 1 is normal to allow change of power supply from that through the bypass circuit 11 to that through inverter circuit 1; and $S_3$, a command signal which progressively advances the phase of the inverter to shift a load when a power supply source supplied to the load is switched from the bypass circuit 11 to the inverter circuit 1.

The operation of the prior art circuit will be described below:

Now, when load is supplied with a power through the inverter circuit 1, a short-circuit accident at the load part (if it happens) results in appearance of overcurrent at the output of the inverter circuit 1. The overcurrent is detected by the overcurrent detector 8 associated with the current sensor 5. The detection signal together with the aforesaid signal $S_1$ is input into the AND circuit 9. When both signals appear on the inputs, the flip-flop 10 is triggered, and causes the thyristor 2 connected to the inverter circuit 1 to turn OFF through the intermediation of the gate drive circuit 13, and at the same time, to turn ON the bypass thyristor switch through the gate drive circuit 12 and the turn-off delay circuit 14. Consequently the connection of the load with power supply through the inverter 1 is changed to that through the bypass circuit 11. When the bypass thyristor switch 7 turns on, therefore, a large short-circuit current from the commercial power supply 6 flows through a fuse 4 of the short-circuit feeder and blows it. Thus, once the output current returns to the normal value, or the overcurrent detector 8 turns OFF, the flip-flop 10 is reset in response to the invert signal, $S_2$, and the output of the AND circuit 9. As the result, the thyristor switch 2 turns ON, and the bypass thyristor switch 7 turns OFF. In this case, owing to the large impedance of the power supply through the inverter circuit 1, upon changing power supply to the load from through the bypass circuit 11 to through the inverter circuit 1, the inverter acts to delay timing to turn OFF the bypass thyristor switch 7, while advancing gradually the phase in accordance with the above-mentioned signal $S_3$.

In the conventional short-circuit protective circuit, as described above, it is necessary for the load to reconnect with the inverter circuit 1 after the fuse 4 has blown, and in turn complicated sequential control of inverter is required. This is a problem encountered in the prior art. Another problem arises in the respect that change to the connection of the load with the bypass circuit 11 may cause a fault of the bypass thyristor switch 7 due to short-circuit current, resulting in the bypass thyristor switch 7 remaining in a conducting state. In this case, reswitching to the connection with the inverter circuit 1 is impossible because of being impossible to turn off the bypass thyristor switch 7. The third problem is that, after turn-on of the thyristor switch 2, gradual increase in transverse current and system down may occur.

SUMMARY OF THE INVENTION

It is the principal object of the invention to provide a short-circuit protective circuit for uninterruptible power supply equipment free from the above-mentioned disadvantages involving the prior art.

Another object of the invention is to provide a simplified and reliable short-circuit protective circuit for uninterruptible power supply equipment which permits, in an accident of short-circuit at the load part, cutting off selectively the short-circuit fault feeder solely by the temporary supply of power through the bypass circuit.

Further objects and advantages of the invention will be apparent from the detailed description of the following embodiment of the invention with reference to the accompanying drawings:

PREFERRED EMBODIMENT OF THE INVENTION

Figure 1:
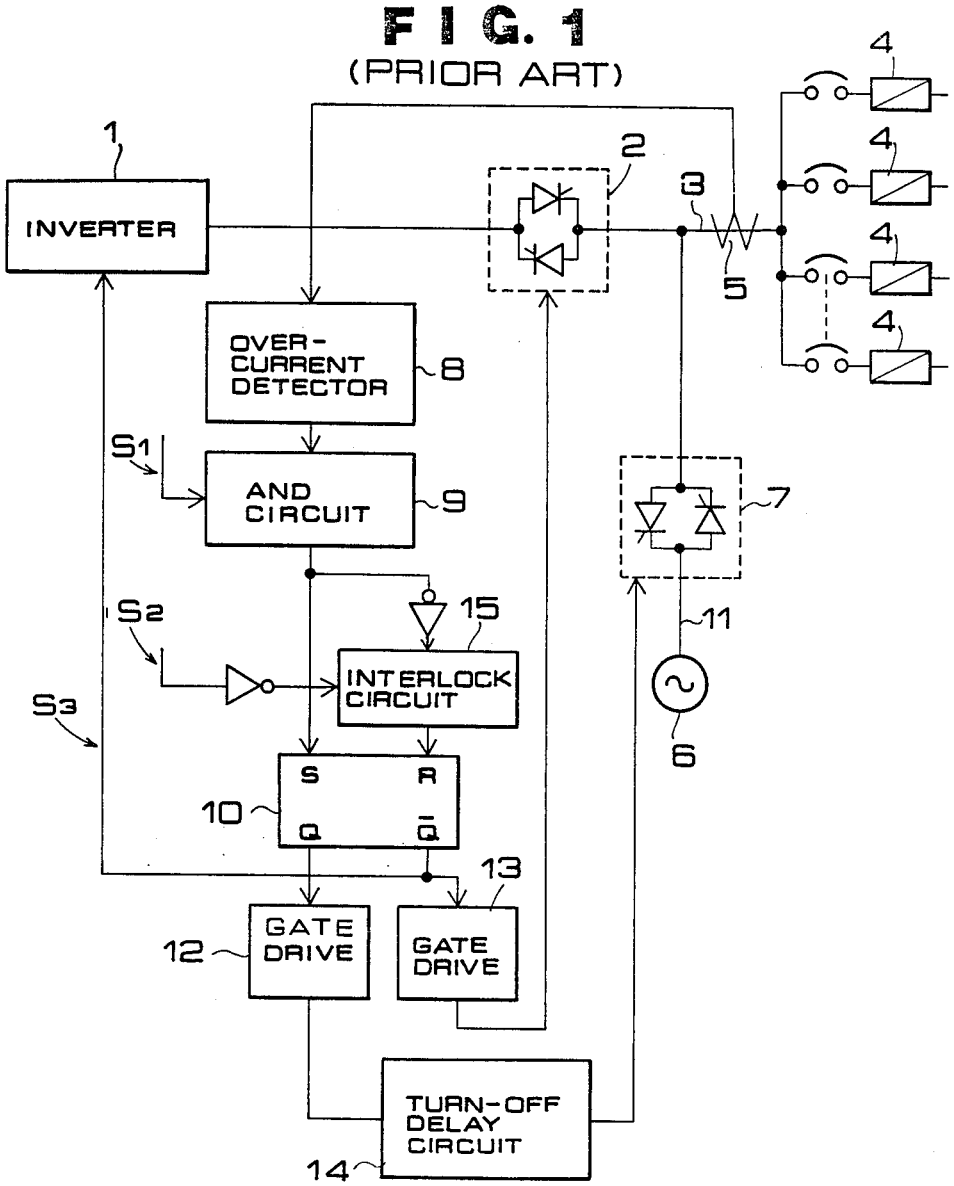
FIG. 1 is a block schematic diagram of a conventional short-circuit protective circuit for uninterruptible power supply equipment.
Figure 2:
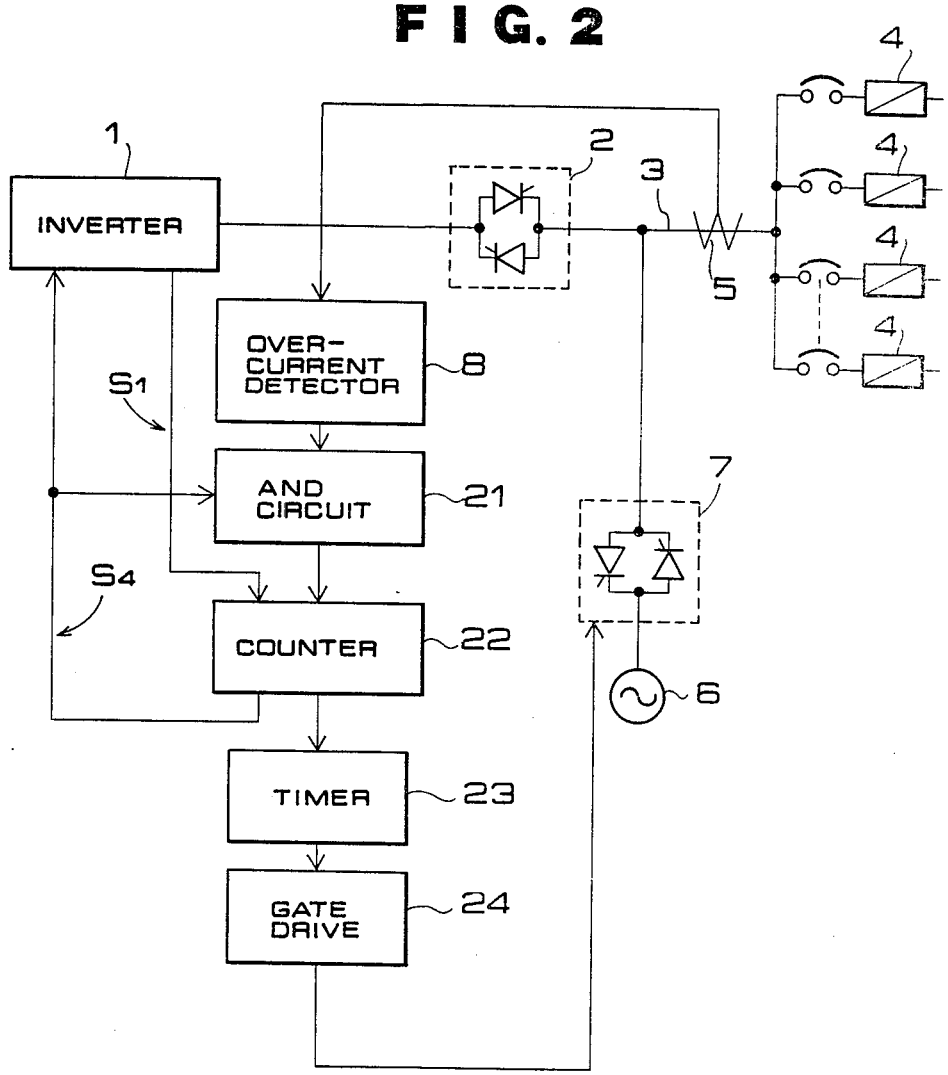
FIG. 2 is a block schematic diagram of an embodiment of short-circuit protective circuit for uninterruptible power supply equipment according to the invention.

Referring to FIG. 2, an embodiment of the invention will be described. In the figure, reference numerals designate 21, an AND circuit providing as an output a logical product of an output signal of the overcurrent detector 8 and an inverter-current limiting action command signal; 22, a counter connected to the output of the AND circuit 21; 23, a timer for monitoring overcurrent time; 24, a gate drive circuit of the bypass thyristor switch 7; and $S_4$, an inverter-current limiting action command signal. In comparison with FIG. 1, corresponding parts are designated by the same numerals, and hence the description of them are omitted.

In the following, the operation of the above-mentioned circuit embodiment will be described. Normally, power is supplied to a load through the inverter circuit 1 which performs the function of uninterruptible power supply at constant voltage and frequency. In an accident of short-circuit at some feeder for the load, the resultant overcurrent is detected by the overcurrent detector 8. The detection signal is supplied to the AND circuit 21. Then the counter 22 provides an output of logic product of the detection signal and a switching permission signal $S_1$ indicating synchronism and the presence of commercial power supply. When signal $S_1$ is OFF, an inverter-current limiting command signal $S_4$ is output, whereas when the logical product conditions are met, the timer 23 outputs a pulse signal lasting for a definite time. It is input to the bypass thyristor switch 7 for a short time through the gate drive circuit 24 and turns the switch ON. Thus within a short time, power is supplied to fuses 4 both through the commercial power 6 and through the inverter circuit 1. The fuse 4 provided in a branch feeder is blown within a few ms due to sufficiently large short-circuit current from the small-impedance commercial power supply 6, and consequently the short-circuited feeder is cut off.

On the other hand, the inverter circuit 1 has a large power supply impedance compared with the commercial power supply 6, and therefore allows little short-circuit current to flow therethrough. Besides the usual synchronous run with commercial power supply 6 contributes to reduced transverse current from the commercial power supply 6 due to a short time lap.

In the case of failure to move short-circuit in the mother line of failure to blow of fuse 4 within not more than several seconds, a current-limiting action command signal $S_4$ is output from the AND circuit 21. In response to this signal, the inverter circuit 1 suppresses current and then its action interrupts. Such short-circuit lasting more than a few milliseconds results in turn in disappearance of output voltage, and system down of load equipment. Therefore, interruption of the fail-safe power supply causes no problem with system operation.

In addition, these effects are obtained also by the construction in which there are a plurality of inverter circuits and, in this connection, an overcurrent detector for detecting the total current disposed in the bypass circuit instead of the provision of a single inverter circuit and a bypass circuit as in the above-mentioned embodiment.

Besides, in the place of the thyristor switch 2 connected to the inverter circuit 1, which is not required to rapidly switch between ON and OFF, the use may be possible of an electrically-operated breaker or contactor.

As above-described, according to the invention, while the inverter circuit remains operating, a commercial power supply is connected through the bypass circuit to the load for a short time, and thereby selective cutting off the short-circuit fault feeder is accomplished. The construction permits a simple sequential control of the inverter circuit, has the effect to prevent the bypass thyristor switch from getting out of order, and provides the advantage that in the case of reswitching from the connection of the load with the bypass circuit to that with the inverter circuit, transverse current flow becomes reduced.

What is claimed is:

1. A short-circuit protective circuit for uninterruptible power supply equipment comprising
    (a) switch means connected between an inverter circuit having a relatively high internal impedance and a plurality of feeders in a load,
    (b) a overcurrent detector connected between said switch means and said feeders for detecting overcurrent in a short-circuit at some feeder in a load,
    (c) an AND circuit receiving a detection signal from said overcurrent detector,
    (d) a counter for receiving an output from the AND circuit and a switching permission signal from said inverter circuit, and supplying an inverter-current limiting command signal to said inverter when said switching permission signal is OFF,
    (e) a timer connected to said counter for outputting a pulse signal lasting for a definite time when logical product conditions are met,
    (f) a bypass thyristor switch turning ON in response to input of a pulse signal from said timer lasting only for a short time applied through a gate drive circuit, and
    (g) a bypass circuit connecting a commercial power supply having a relatively low internal impedance to the load for selective cutting off of the feeder having a short-circuit therein by supply of energy from said commercial power supply to the load only for said short time to activate circuit interrupting protective means in said short-circuited feeder during said short time while said inverter circuit remains operating.

2. A short-circuit protective circuit defined in claim 1 wherein said switch means connected between said inverter circuit and said plurality of feeders is a thyristor switch.

* * * * *